(12) United States Patent
Lohwasser

(10) Patent No.: US 9,752,376 B2
(45) Date of Patent: Sep. 5, 2017

(54) INSULATING GLAZING UNIT

(71) Applicant: Amcor Flexibles Kreuzlingen Ltd., Kreuzlingen (CH)

(72) Inventor: Wolfgang Lohwasser, Gailingen (DE)

(73) Assignee: Amcor Flexibles Kreuzlingen Ltd., Kreuzlingen (CH)

( * ) Notice: Subject to any disclaimer, the term of this patent is extended or adjusted under 35 U.S.C. 154(b) by 145 days.

(21) Appl. No.: 14/435,067

(22) PCT Filed: Oct. 10, 2013

(86) PCT No.: PCT/EP2013/003044
§ 371 (c)(1),
(2) Date: Apr. 10, 2015

(87) PCT Pub. No.: WO2014/056614
PCT Pub. Date: Apr. 17, 2014

(65) Prior Publication Data
US 2015/0284987 A1 Oct. 8, 2015

(30) Foreign Application Priority Data

Oct. 12, 2012 (EP) .................................... 12007107

(51) Int. Cl.
*E06B 3/663* (2006.01)
*B32B 27/08* (2006.01)
*B32B 27/30* (2006.01)
*B32B 27/32* (2006.01)
(Continued)

(52) U.S. Cl.
CPC .......... *E06B 3/66352* (2013.01); *B32B 27/08* (2013.01); *B32B 27/306* (2013.01);
(Continued)

(58) Field of Classification Search
CPC ...... E06B 3/66352; E06B 3/6621; E06B 3/66; E06B 3/67321; E06B 6/677; Y02B 80/22; Y02B 80/24
See application file for complete search history.

(56) References Cited

U.S. PATENT DOCUMENTS 5,154,789 A * 10/1992 Ossian ................ B29C 47/0021
156/229
5,270,092 A * 12/1993 Griffith ..................... B32B 3/12
428/116
(Continued)

FOREIGN PATENT DOCUMENTS

DE 19530838 2/1997
EP 1036813 9/2000
(Continued)

OTHER PUBLICATIONS

International Preliminary Report on Patentability and Written Opinion for International Application No. PCT/EP2013/003044 mailed Apr. 14, 2015.
(Continued)

*Primary Examiner* — Donald J Loney
(74) *Attorney, Agent, or Firm* — RatnerPrestia

(57) ABSTRACT

Insulating glazing unit containing at least one spacer for the spacing of glass panes received in a frame, wherein a barrier film is applied to the spacer, at least on the side directed towards the frame. The barrier film is a composite film, which, on the side directed towards the spacer, has an adhesive or sealing layer as the internal layer and, on the side directed towards the frame, a barrier layer containing oriented EVOH and a thin adhesive layer of metal or metal oxide located on the outside and directed towards the frame.

20 Claims, 3 Drawing Sheets

(51) Int. Cl.
    *B32B 27/36*     (2006.01)
    *B32B 37/12*     (2006.01)
    *E06B 3/66*     (2006.01)
    *E06B 3/677*     (2006.01)
    *E06B 3/673*     (2006.01)

(52) U.S. Cl.
    CPC .............. *B32B 27/32* (2013.01); *B32B 27/36* (2013.01); *B32B 37/12* (2013.01); *E06B 3/6621* (2013.01); *B32B 2255/10* (2013.01); *B32B 2255/20* (2013.01); *B32B 2307/514* (2013.01); *B32B 2307/7242* (2013.01); *E06B 3/66* (2013.01); *E06B 3/677* (2013.01); *E06B 3/67321* (2013.01); *E06B 2003/6638* (2013.01); *Y02B 80/22* (2013.01); *Y02B 80/24* (2013.01)

(56) References Cited

U.S. PATENT DOCUMENTS

| | | |
|---|---|---|
| 7,490,445 B2 | 2/2009 | Steffek |
| 2007/0261359 A1 | 11/2007 | Buchanan |

FOREIGN PATENT DOCUMENTS

| | | |
|---|---|---|
| EP | 1787796 | 5/2007 |
| EP | 2218862 | 8/2010 |

OTHER PUBLICATIONS

International Search Report for International Application No. PCT/EP2013/003044 mailed Apr. 22, 2014.

* cited by examiner

INSULATING GLAZING UNIT

CROSS-REFERENCE TO RELATED APPLICATIONS

This application is a U.S. National Phase Application of International Application No. PCT/EP2013/003044, filed Oct. 10, 2013, which claims priority of European Application No. EP 12007107.1, filed Oct. 12, 2012. The disclosures of each of these applications are incorporated herein by reference in their entirety for all purposes.

FIELD OF THE INVENTION

The invention relates to an insulating glazing unit containing at least one spacer for spacing glass panes received in a frame, and to a method for the production thereof.

DISCUSSION OF THE RELATED ART

Insulating glazing units have been known for a long time, in particular as multiply-glazed windows. This type of glazing is used, in particular, for good heat and sound insulation. Windows of this type consist of at least two glass panes, which are arranged in parallel and are spaced apart by spacers. In this case, an intermediate space that is filled with air or gas as the insulation medium is produced between the glass panes.

The spacers are generally arranged along the window frame and are expediently rigidly connected to the glass panes by a thermoplastic sealing material by pressing.

The spacers generally have a cavity to receive a drying agent. This drying agent is used to absorb the residual moisture located in the intermediate space of the panes. For this purpose, the spacers have certain openings or slots toward the intermediate space of the panes so the moisture can reach the cavities of the spacers filled with drying agent.

The spacers are expediently configured in such a way that they prevent the penetration of moisture from the frame into the intermediate space of the panes. For this purpose, various sealing agents located between the frame and spacer are used.

In order to ensure an adequate barrier effect, EP 2 218 862 A2 or US 2007/0261359 A1, for example, teaches at least partially applying a barrier film to the external sides of the spacers. This relates, in particular, to the sides directed towards the frame and some of the side faces of the spacers.

If the barrier film is welded or glued during the assembly of the insulating glazing unit onto the spacer profiles, the barrier film is exposed to high mechanical stresses. Owing to the longitudinal expansion of the barrier films, their barrier effect is often greatly reduced here. Even if the flexible spacers are applied during the production of the insulating glass to the panes by means of robots, the spacer profiles and therefore also the barrier films are exposed to high tensile stresses.

The sealing materials which are known from the prior art often only have slight adhesion in relation to plastics material surfaces of composite films. In particular, the conventional primary sealing materials (butyl) applied in composite glass panes and the secondary sealing materials (silicones, polysulphides, polyurethanes) only adhere moderately on the plastics material composite films which are conventionally applied for this application without the use of primers. As a result, in particular in the case of relatively large temperature fluctuations, leaks easily occur between a film composite of this type, for example a barrier film, and the glass panes. Such leaks often lead to premature loss of inert gas in the intermediate space of the glass panes and therefore to a prematurely reduced insulating effect of the insulating glazing unit.

SUMMARY OF THE INVENTION

The object of the present invention is to reduce the drawbacks mentioned of existing insulating glazing units and to provide an insulating glazing unit with a barrier film with barrier properties that are improved compared to the prior art with respect to the passage of gas and moisture. In this case, the requirements of the standards EN-1279-1 and EN-1279-3 (gas leakage rate) have to be taken into account, in particular, according to which the gas loss in the insulating glazing unit, i.e. the inert gas located between the panes, has to be less than 10% after 10 years. In order to achieve this, the OXTR value (oxygen transmission rate) has to be $\leq 0.5$ $cm^3/m^2/24$ h/bar.

A further object is to provide an insulating glazing unit containing barrier films with lower heat conduction properties compared to the prior art.

An insulating glazing unit containing at least one spacer for spacing glass panes received in a frame, wherein a barrier film is at least partially applied to the spacer on the side directed towards the frame, wherein the barrier film is a composite film, which has an adhesive or sealing layer as the internal layer on the side directed towards the spacer, and wherein the composite film, on the side directed towards the frame, has a barrier layer containing oriented EVOH and a thin adhesive layer of metal or metal oxide located on the outside and directed towards the frame, leads to the achievement of these objects.

DETAILED DESCRIPTION OF THE INVENTION

Figure 1:
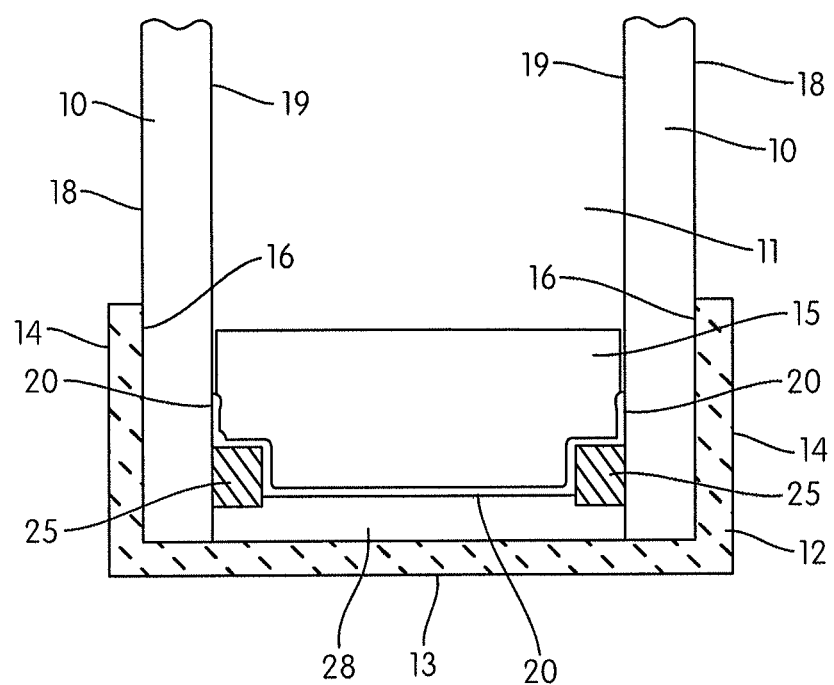
FIG. 1 schematically shows a cross section through a part of an insulating glazing unit.

An insulating glazing unit according to the invention contains at least one spacer for spacing glass panes received in a frame, a barrier film being at least partially applied to the spacer on the side directed toward the frame. In this case, the barrier film is a composite film, which, on the side directed toward the spacer, has an adhesive or sealing layer as the internal layer and, on the side directed toward the frame, has a barrier layer containing oriented EVOH and a thin adhesive layer of metal or metal oxide located on the outside and directed toward the frame.

The important point here is that the EVOH layer is present owing to stretching as an oriented EVOH layer. In this case, EVOH stands for ethylene vinyl alcohol copolymer.

The frame generally consists of a U-shaped profile, which runs around the glass pane edges and has, in cross section, a base side and flanks adjacent thereto on both sides and perpendicular to the base side. The internal sides of the flanks of the frame that are directed towards one another in each case receive one edge of the external side of the glass panes.

The spacers preferably consist of flexible material and are preferably cut off from a band profile.

The barrier film is preferably at least partially applied to the sides of the spacer which is directed towards the glass panes.

The layer thickness of the layer of oriented EVOH is preferably between 8 and 30 µm and, in particular, between 10 and 15 µm.

The internal layer of the barrier film, on the side directed toward the spacer, preferably has a PE layer. The internal layer may, in this case, consist of a pure polyethylene layer, or may be a coextruded oPP film with a sealing layer, the sealing layer for PE-based spacers being of PE and forming the outer layer. A coextruded oPP film with a sealing layer of PE is called a coextruded oPP-PE layer below. In this case, oPP stands for oriented polypropylene.

The thin adhesive layer preferably consists of $SiO_x$ or $AlO_y$, x being greater than 0.9 and less than 2, and y being greater than 0.8 and less than 1.5. These adhesive layers preferably have a layer thickness of at least 10 nm, the layer thickness preferably being less than 1 µm, in particular less than 0.2 µm and quite particularly preferably less than 0.1 µm.

Metal oxide layers are preferred compared to thin metal layers for the thin adhesive layers as they have better corrosion resistance and lower heat conductivity.

The thin adhesive layers are preferably deposited by a vacuum process, in particular by vaporisation, sputtering or by a plasma CVD process. In this case CVD stands for Chemical Vapour Deposition. The adhesive layers may more preferably also be deposited by a reactive gas phase process, optionally also at atmospheric pressure, in particular by a plasma CVD process or ALD (Atomic Layer Deposition).

The barrier film which is used in the insulating glazing unit according to the invention is considered to be metal-free, even if the thin adhesive layer consists of metal or metal oxide as the metal layers mentioned are so thin that they do not influence the heat conduction of the barrier layer or only an insignificant amount.

The barrier composite films used in the insulating glazing unit according to the invention, even after application to the spacers by means of a robot or automaton, still have excellent barrier properties with respect to gas diffusion and low heat conduction. In addition, these barrier films which are applied to the spacers also have excellent adhesion to the spacer profiles and to the glass panes.

The barrier films are preferably applied to a spacer profile unwound from a roll.

The insulating glazing unit according to the invention has at least two glass panes and a peripheral frame receiving the edges of the glass panes. The glass panes are held apart by means of a spacer. The frame, in cross section, has a base side and flanks adjacent thereto on both sides and perpendicular to the base side. The region between the base side and a respective flank forms a corner region of the frame.

The spacer, in the regions directed toward the corner regions of the frame, advantageously has a step-like recess to receive a primary sealing agent. The primary sealing agent preferably consists of butyl.

The barrier film preferably covers the part of the spacer directed toward the frame and some of the side faces of the spacer directed toward the panes. The space between the frame and face of the spacer element, to which the barrier film is applied, between the primary sealing agent and the exposed surface of the primary sealing agent is filled with a secondary sealing agent. The secondary sealing agents preferably consist of silicone, polysulphides or polyurethane.

The space located between the panes and enclosed by the free surface of the spacer(s) is filled with inert gas, preferably with argon. An adhesive band can furthermore be applied at least partially on the side faces of the spacer directed toward the panes.

A preferred configuration of the barrier layer has a PET layer and a layer of oriented EVOH, the thin adhesive layer of metal or metal oxide being applied to the PET layer. The PET layer preferably has a thickness of 12 to 50 µm here.

In a further preferred embodiment, the barrier layer of the barrier film between the layer of oriented EVOH and the PET layer has a thin layer of metal oxide. This thin layer preferably consists of $SiO_x$ or $AlO_y$, wherein x is greater than 0.9 and less than 2, and y is greater than 0.8 and less than 1.5. The layer thickness of the thin layer is preferably at least 10 nm, but less than 1 µm. The layer thickness of the thin layer is quite preferably less than 0.2 µm and, in particular, less than 0.1 µm.

The application of the barrier film to the spacer preferably takes place as welding by sealing the internal layer of the barrier film to the spacer. To weld the barrier film to the spacer, at least one outer layer of the spacer and the internal layer of the barrier film preferably consist of the same material. A PE layer is preferably used for this purpose as the sealing layer. The barrier film may, however, also be glued to the spacer.

The space located between the glass panes and the exposed surface of the spacer is preferably filled with an inert gas, in particular with argon.

A method for producing a barrier film for an insulating glazing unit according to the invention also belongs to the invention, wherein a composite film is produced as a barrier film, which, on the one side, has an outer adhesive or welding layer as the internal layer and a barrier layer laminated thereon containing oriented EVOH, and on the other outer side of the composite film, has a thin adhesive layer of metal or metal oxide.

The method relates to the production of a vapour and gas barrier for an insulating glazing unit according to the invention containing at least one spacer for spacing glass panes received in a frame, a barrier film being applied as a vapour and gas barrier layer at least on the side of the spacer directed toward the frame and being non-separably connected thereto. In this case, a composite film is firstly produced as the barrier film, which, on the side directed toward the spacer, has an adhesive or welding layer as the internal layer and, on the external side directed toward the frame, has a barrier layer containing oriented EVOH and an outer thin adhesive layer of metal or metal oxide directed toward the frame. Thereafter, the spacer is glued or welded to the barrier layer.

EXAMPLES

A measure of the quality of a vapour and gas barrier is the oxygen transmission rate. It should be made clear here that the corresponding argon transmission rate approximately corresponds to a third of the oxygen transmission rate.

Various film composites were produced in the framework of the invention and their oxygen transmission rates (oxygen transmission rate in [$cm^3/m^2/24$ h/bar]) were measured. In Table I, the values determined in this manner are shown in the column OXTR composite.

However, the OXTR values of the film composites welded onto the spacer profile are important, as the OXTR values of the film composite generally change by application to the spacers.

The various film composites were then welded by means of a pressure roller heated to a temperature of 120° C. onto a flexible plastics material profile made of a thermoplastic elastomer with a profile width of 19 mm and wound onto a tube at a moderate tension of 30N. The tube had a diameter of 300 mm. Thereafter, the oxygen transmission rate (oxygen transmission rate in [$cm^3/m^2/24$ h/bar]) of the profile (spacer profile) was measured including the welded-on film composite. It was shown there that, in addition to the oxygen permeation through the EVOH, in particular the adhesion of the barrier layer film composite is very important (in relation to the spacer and the panes). The determined values are shown in Table I in the column OXTR profile.

The examples show that barrier layers of oriented EVOH with an $SiO_x$ coating (0.9<x<2) have particularly good barrier properties with respect to the oxygen transmission rate. In addition $SiO_x$ has low heat conductivity and a high chemical resistance.

Spacer profiles, to which a barrier film has been applied, with an OXTR value of $0.5 cm^3/m^2/24$ h/bar or less are preferred.

TABLE I

| Film composite | OXTR composite $cm^3/m^2/24$ h/bar | OXTR profile $cm^3/m^2/24$ h/bar |
| --- | --- | --- |
| $SiO_x$/PET (23 μm)/adhesive/$SiO_x$/PET (12 μm)/adhesive/PE (70 μm) | 0.2 | 8-15 |
| $SiO_x$/PET (23 μm)/$SiO_x$/EVOH (non-oriented)/oPP (0.5 μm)/PE | 0.1 | 2 |
| $SiO_x$/PET (23 μm)/EVOH (non-oriented, 20 μm)/oPP (0.5 μm)/PE | 1.5 | 1.5 |
| $SiO_x$/PET (23 μm)/EVOH (oriented, 12 μm)/oPP (0. μm)/PE | 0.5 | 0.5 |
| $SiO_x$/PET (23 μm)/$SiO_x$/EVOH (oriented, 12 μm)/oPP (0.5 μm)/PE | <0.1 | <0.1 |

Further advantages, features and details of the invention emerge from the following description of preferred embodiments and with the aid of the drawings.

Figure 2:
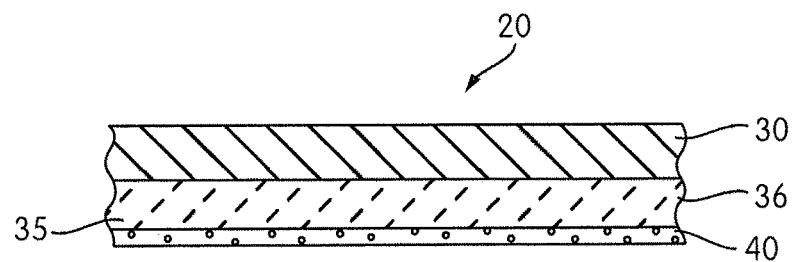
FIG. 2 shows a cross section of a first barrier film.
Figure 3:
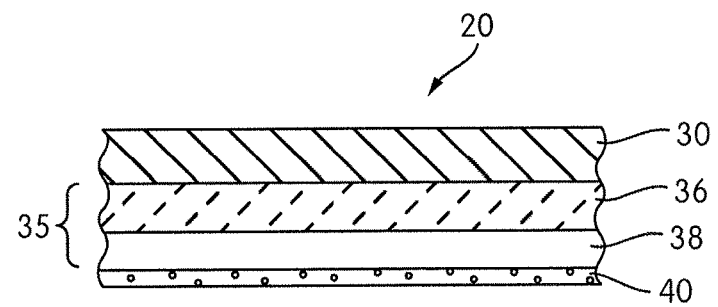
FIG. 3 shows a cross section of a second barrier film.
Figure 4:
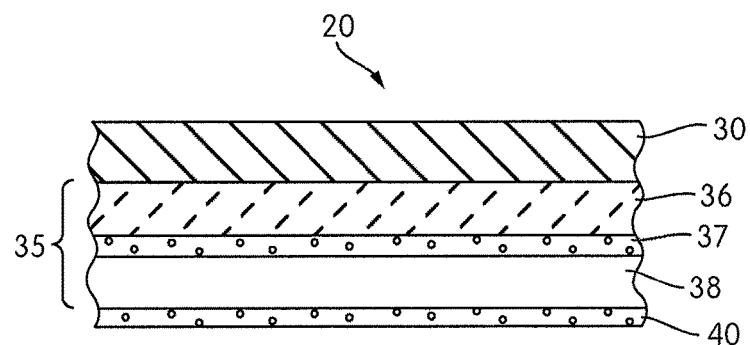
FIG. 4 shows a cross section of a third barrier film.
Figure 5:
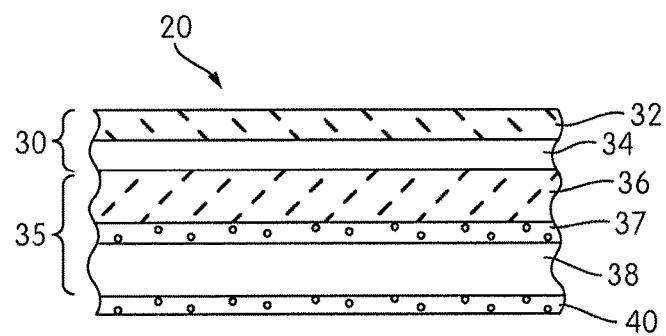
FIG. 5 shows a cross section of a fifth barrier film.

FIG. 1 schematically shows a cross section through a part of an insulating glazing unit;

FIG. 2 shows a cross section of a first barrier film;

FIG. 3 shows a cross section of a second barrier film;

FIG. 4 shows a cross section of a third barrier film;

FIG. 5 shows a cross section of a fifth barrier film.

FIG. 1 schematically shows a cross section through a lower part of an insulating glazing unit, in which two panes 10 are received in a frame 12, the panes 10 being held apart by means of a spacer 15. The frame 12 is U-shaped in cross section and, on the one hand, has a horizontal element 13 with a perpendicular flank 14 formed on both sides. The internal sides 16 of the flanks 14 receive an edge region of the external sides 18 of the panes 10 here and the spacer element 15 is arranged between the internal sides 19 of the panes 10. The spacer element 15, at the lower edge, at the corners of the frame 12 directed toward the flanks 14 between the horizontal element 13 and the perpendicularly projecting flanks 14, in each case has a step-like recess to receive a primary sealing agent 25. A barrier film 20 covers the lower part of the spacer element 15 directed toward the frame 12 and toward the primary sealing agent 25 as well as a part of the side faces of the spacer element 15 directed toward the panes 10. The space located between the panes 10 between the frame 12 and the lower side of the spacer element 15 that has the barrier film 20 applied and the lower side of the primary sealing agent 25 is filled with a secondary sealing agent 28. The space 11 located between the panes 10 above the spacer 15 is filled with an inert gas, preferably with argon. An adhesive band may be applied on the side faces of the spacer 15 directed toward the panes 10 (not shown).

The primary sealing agent preferably consists of butyl. Butyl has a good barrier effect in relation to gases but is water-sensitive. The secondary sealing agents preferably consist of silicone, polysulphides or polyurethane.

The barrier composite layer 20 shown in FIG. 2 has an internal layer 30 and a layer 36 laminated thereon of oriented EVOH. In this case EVOH stands for ethylene vinyl alcohol copolymer. It is important to the invention here that the EVOH layer is oriented by a stretching method. The EVOH layer also has a thin adhesive layer 40, the adhesive layer preferably being a thin layer of $SiO_x$. The barrier film 20 shown in cross section in FIG. 2 has only a single layer as the barrier layer 35, namely the oriented EVOH layer 36. However, the adhesive layer 40 at layer thicknesses of more than 10 nm, also partly takes on the function of a further barrier layer. The barrier film 20, in the assembled state, comes to rest with the internal layer 30 on the spacer 15, the region of the adhesive layer 40 located on the lower side of the spacer between the primary sealing agents 25 being in contact with the secondary sealing agent 28 in the assembled state of the insulating glazing unit. The internal layer 30 is preferably a polyethylene film or a coextruded oPP (oPP=oriented polypropylene) film with a sealing layer, wherein the sealing layer for PE-based spacers is made of PE and forms the outer layer, i.e. the layer directed toward the spacer 15.

The cross section of a further preferred barrier film 20 shown in FIG. 3 in turn shows an internal layer 30 and a layer 36 laminated thereon of oriented EVOH in the sense of FIG. 2. A further layer 38 of PET is, however, also located on the layer 36 of oriented EVOH. The EVOH and PET layers 36, 38 together form the barrier layer 35. A thin adhesive layer 40, preferably consisting of $SiO_x$ or $AlO_y$, is also deposited on the side of the PET layer 38 pointing away from the EVOH layer 36.

FIG. 4 shows a schematically shown cross section through a further preferred barrier film 20. The layer construction, except for the intermediate layer 37, corresponds to that of FIG. 3. The thin layer 37 which is arranged between the layer 36 of oriented EVOH and the PET layer 38 is preferably an $SiO_x$ or $AlO_y$ layer deposited in a vacuum. The barrier layer 35 therefore contains the layer 36 of oriented EVOH, the thin layer 37 and the PET layer 38. A thin adhesive layer 40 of metal or metal oxide is in turn located on the side of the PET layer 38 pointing away from the internal layer 30. In the installed state, the internal layer 30 is located on the lower and lateral external side of the spacer element 15.

FIG. 5 shows a schematic cross section of a particularly preferred embodiment of a barrier film 20. The layer structure corresponds to that as shown in FIG. 4, but the internal layer 30 consists of a coextruded oPP-PE layer, the PE layer 32 located on the oPP layer 34 coming to rest against the spacer element 15 in the installed state. The PE layer 32 is preferably used as a sealing layer to weld the barrier film 20 to the spacer element 15.

The invention claimed is:

1. An insulating glazing unit comprising panes received in a frame, the panes being held apart by a spacer, wherein a barrier film is at least partially applied to the spacer on the side directed towards the frame, wherein the barrier film is a composite film, which has an adhesive or sealing layer as the internal layer on the side directed towards the spacer, wherein the composite film, on the side directed towards the frame, has a barrier layer containing oriented EVOH and a thin adhesive layer of metal or metal oxide located on the outside and directed towards the frame.

2. An insulating glazing unit according to claim 1, wherein the EVOH layer of the barrier layer of the composite film is stretched in such a way that the spacer, to which the composite film is applied, has an OXTR value of 0.5 cm$^3$/m$^2$/24 h/bar or less.

3. An insulating glazing unit according to claim 1, wherein the barrier film is at least partially applied to the sides of the spacer directed toward the glass panes.

4. An insulating glazing unit according to claim 1, wherein the layer thickness of the layer of oriented EVOH is between 8 and 30 μm.

5. An insulating glazing unit according to claim 1, wherein the internal layer of the barrier film consists of PE or of a coextruded oriented polypropylene-PE layer.

6. An insulating glazing unit according to claim 1, wherein the thin adhesive layer consists of $SiO_x$ or $AlO_y$, wherein x is greater than 0.9 and less than 2, and y is greater than 0.8 and less than 1.5.

7. An insulating glazing unit according to claim 6, wherein the thin adhesive layer has a layer thickness of at least 0.2 nm, but less than 1 μm.

8. An insulating glazing unit according to claim 1, wherein the barrier layer of the barrier film has a PET layer and a layer of oriented EVOH, wherein the thin adhesive layer of metal or metal oxide is applied to the PET layer.

9. An insulating glazing unit according to claim 8, wherein the PET layer has a thickness of 12 to 50 μm.

10. An insulating glazing unit according to claim 8, wherein the barrier layer of the barrier film has a further thin layer of metal oxide between the layer of oriented EVOH and the PET layer.

11. An insulated glazing unit according to claim 10, wherein the further thin layer consists of $SiO_x$ or $AlO_y$, wherein x is greater than 0.9 and less than 2, and y is greater than 0.8 and less than 1.5.

12. An insulating glazing unit according to claim 11, wherein the further thin layer has a layer thickness of at least 10 nm, but less than 1 μm.

13. An insulating glazing unit according to claim 1, wherein the application of the barrier film to the spacer is welding by sealing the internal layer of the barrier film to the external face of the spacer.

14. An insulating glazing unit according to claim 13, wherein at least an outermost layer of the spacer and the internal layer of the barrier film substantially consist of the same polymer.

15. An insulating glazing unit according to claim 1, wherein the space located between the glass panes and the exposed surface of the spacer contains a gas filling of argon.

16. An insulating glazing unit according to claim 1, wherein the spacer has an internal structure containing a drying agent and a silicone-free external cover surrounding the internal structure.

17. A method for producing a barrier film for an insulating glazing unit according to claim 1, comprising producing the composite film as a barrier film, which, on the one side, has an outer adhesive or sealing layer as the internal layer and a barrier layer laminated thereon containing oriented EVOH and, on the other outer side of the composite film, a thin adhesive layer of metal or metal oxide.

18. An insulating glazing unit according to claim 1, wherein the layer thickness of the layer of oriented EVOH is between 10 and 15 μm.

19. An insulating glazing unit according to claim 6, wherein the thin adhesive layer has a layer thickness of at least 0.2 nm, but less than 0.1 μm.

20. An insulating glazing unit according to claim 11, wherein the further thin layer has a layer thickness of at least 10 nm, but less than 0.1 μm.

* * * * *